US008368932B2

(12) United States Patent
Inui

(10) Patent No.: US 8,368,932 B2
(45) Date of Patent: Feb. 5, 2013

(54) USER INTERFACE AND METHOD OF CONTROLLING THE SAME, STORAGE MEDIUM, AND IMAGE PROCESSING APPARATUS

(75) Inventor: Masanobu Inui, Chigasaki (JP)

(73) Assignee: Canon Kabushiki Kaisha (JP)

( * ) Notice: Subject to any disclaimer, the term of this patent is extended or adjusted under 35 U.S.C. 154(b) by 522 days.

(21) Appl. No.: 12/608,351

(22) Filed: Oct. 29, 2009

(65) Prior Publication Data

US 2010/0103461 A1 Apr. 29, 2010

(30) Foreign Application Priority Data

Oct. 29, 2008 (JP) ................................ 2008-278446

(51) Int. Cl.
*G06F 15/00* (2006.01)
(52) U.S. Cl. ........................................ 358/1.15; 358/1.9
(58) Field of Classification Search ........................ None
See application file for complete search history.

(56) References Cited

U.S. PATENT DOCUMENTS

| 2006/0028661 | A1* | 2/2006 | Uruma | ............................ | 358/1.6 |
| 2006/0224559 | A1* | 10/2006 | Abiko | ................................ | 707/1 |
| 2008/0062458 | A1* | 3/2008 | Inui | ............................ | 358/1.15 |
| 2008/0088865 | A1* | 4/2008 | Nagai | ............................ | 358/1.13 |
| 2008/0180703 | A1* | 7/2008 | Yamada | ............................ | 358/1.9 |
| 2008/0231884 | A1* | 9/2008 | Okazaki | ........................ | 358/1.15 |
| 2008/0259377 | A1* | 10/2008 | Sai et al. | ........................ | 358/1.13 |
| 2009/0037071 | A1* | 2/2009 | Inoue | ................................ | 701/96 |
| 2009/0201547 | A1* | 8/2009 | Noguchi et al. | ............. | 358/1.15 |
| 2009/0296128 | A1* | 12/2009 | Hasegawa | ..................... | 358/1.14 |

FOREIGN PATENT DOCUMENTS

| JP | 2007-028105 A | 2/2007 |
| JP | 2008-236751 A | 10/2008 |

OTHER PUBLICATIONS

Japanese Office Action cited in Japanese counterpart application No. JP2008-278446, dated Nov. 27, 2012.

* cited by examiner

*Primary Examiner* — Twyler Haskins
*Assistant Examiner* — Helen Q Zong
(74) *Attorney, Agent, or Firm* — Rossi, Kimms & McDowell LLP

(57) ABSTRACT

A user interface which makes it possible to easily and more accurately configure a user mode. The user interface has an application mode configuration screen for configuring settings for an application mode when executing a job and a user mode configuration screen for configuring settings for a user mode before executing the job. When the user mode configuration screen is to be displayed, it is determined whether or not the application mode configuration screen is being displayed. When it is determined that the application mode configuration screen is being displayed, a liquid crystal display displays user mode items related to settings to be configured for the application mode on the application mode configuration screen being displayed.

9 Claims, 22 Drawing Sheets

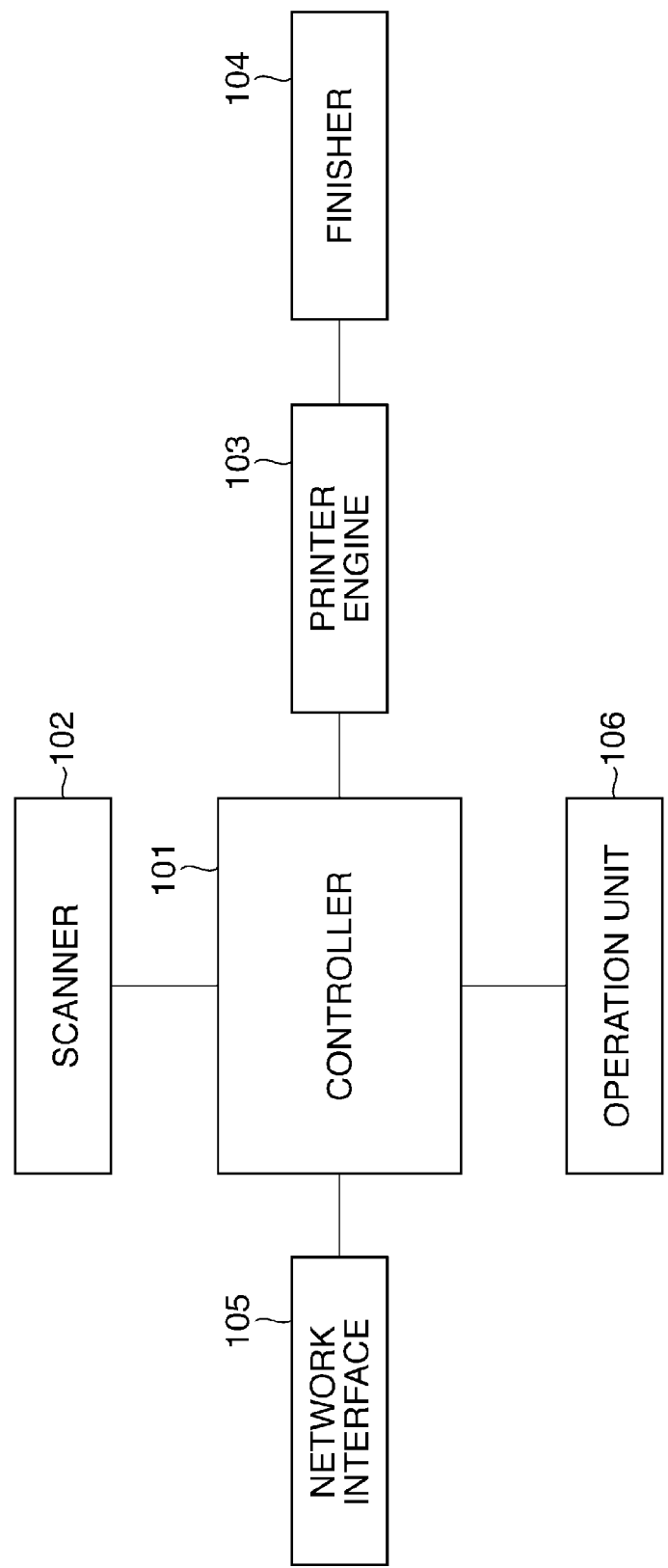

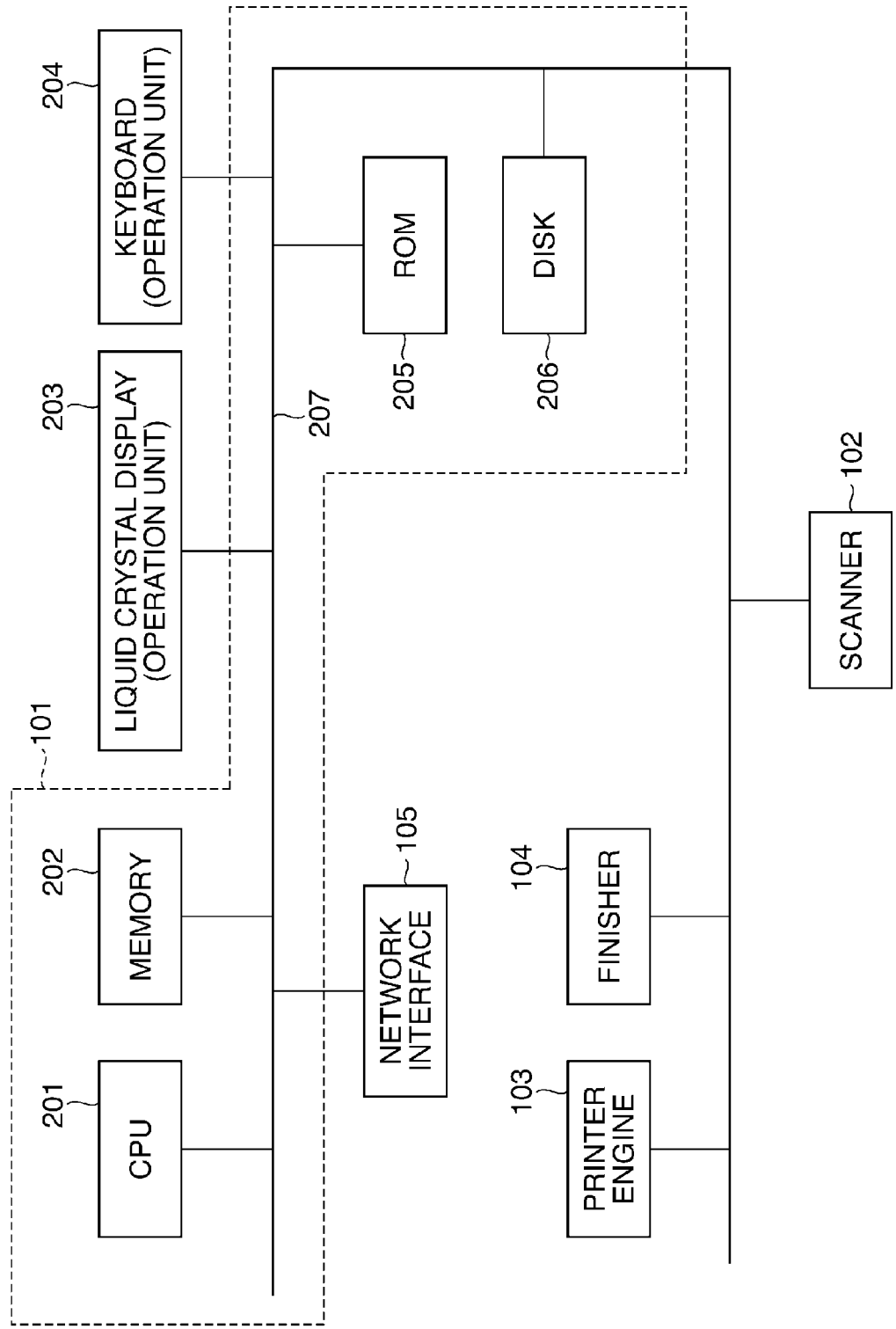

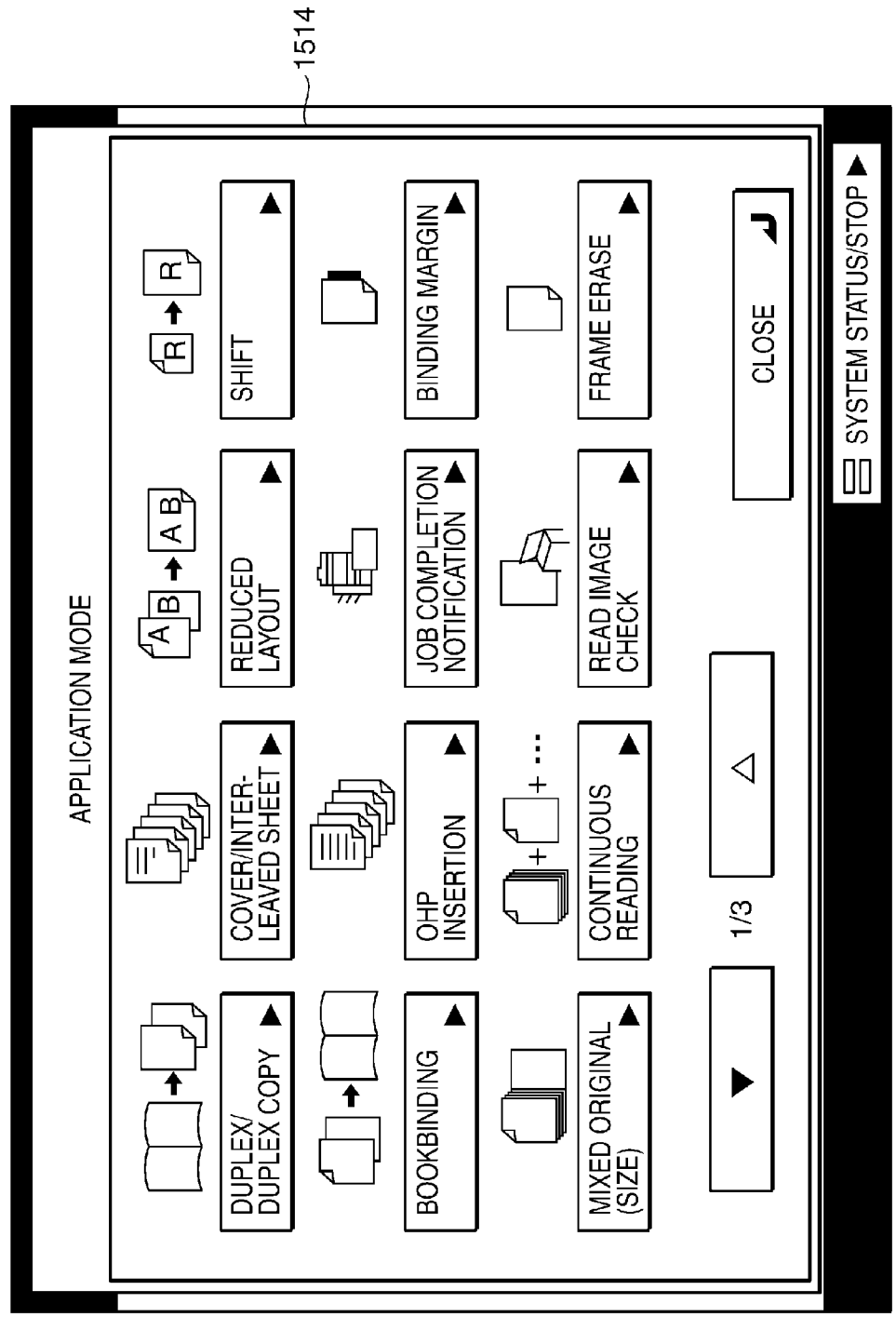

FIG.5C-3

JOB TICKET EDIT/CHECK — 1519

20060406192237

■ GENERAL CONFIGURATION

[ ] — 1520 — EDIT ▲    PREVIEW ▲    ◁ ▶ 1/1

■ PAGE RANGE-SPECIFIC CONFIGURATION

| ✓ | PAGE RANGE | SIZE | SHEET TYPE/SHEET FEED LOCATION | SINGLE-SIDED/ DOUBLE-SIDED |
|---|---|---|---|---|
| ☐ | 1-4 PAGES | A5 R | 1 SHEET FEED LOCATION 1 | SINGLE-SIDED |
| ☐ | 2-3 PAGES | A5 R | 2 SHEET FEED LOCATION 2 | SINGLE-SIDED |
| ☐ | 6-7 PAGES | B4 | 4 SHEET FEED LOCATION 4 | SINGLE-SIDED |
| ☐ | 6-9 PAGES | B5 R | 5 SHEET FEED LOCATION 5 | SINGLE-SIDED |
| ☐ | 10-12 PAGES | B5 | 6 SHEET FEED LOCATION 6 | SINGLE-SIDED |

[ ] FULL SELECTION    1521 — EDIT ▲    ◁ ▶ 1/2

CLOSE ⤵

▦ SYSTEM STATUS/STOP ▲

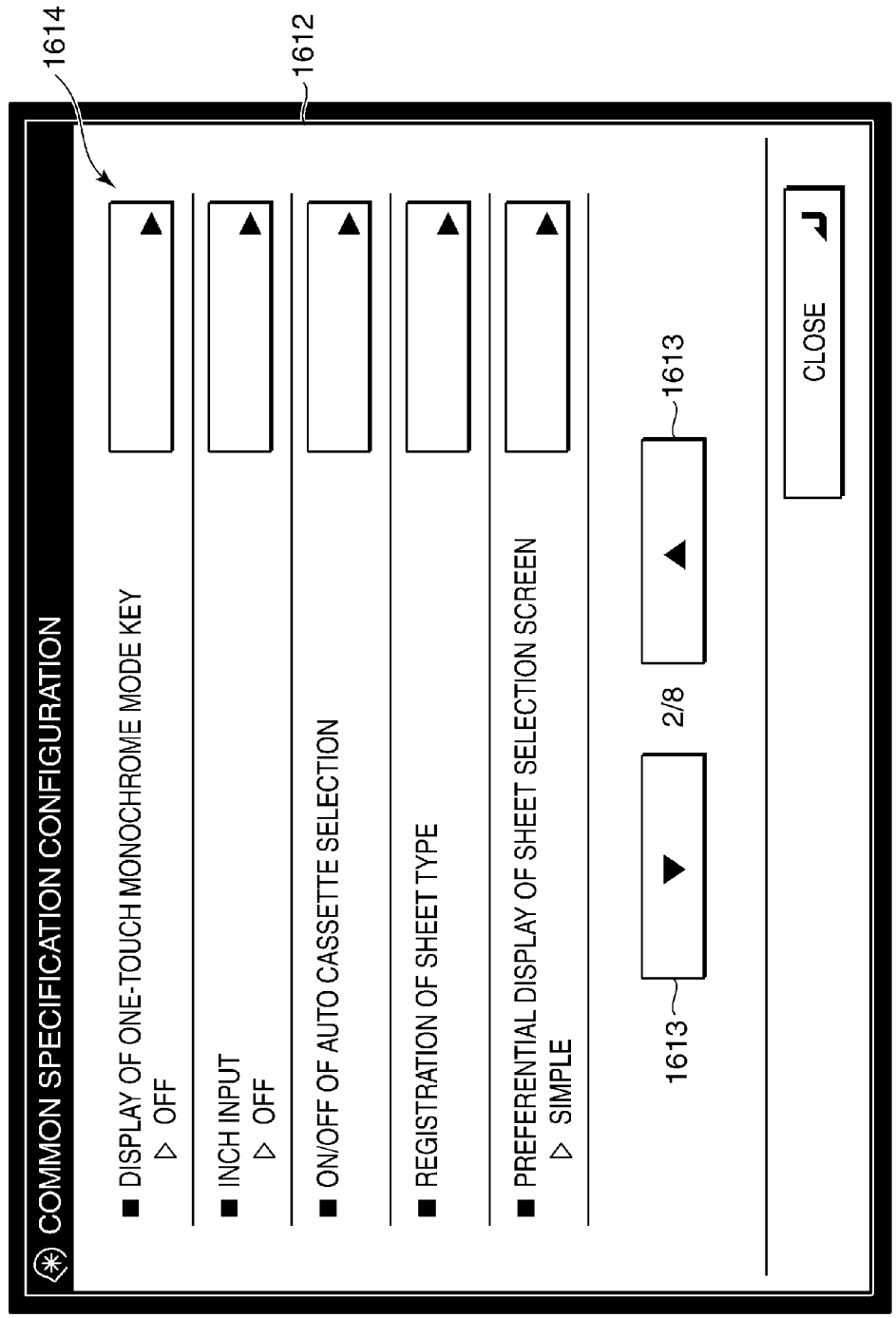

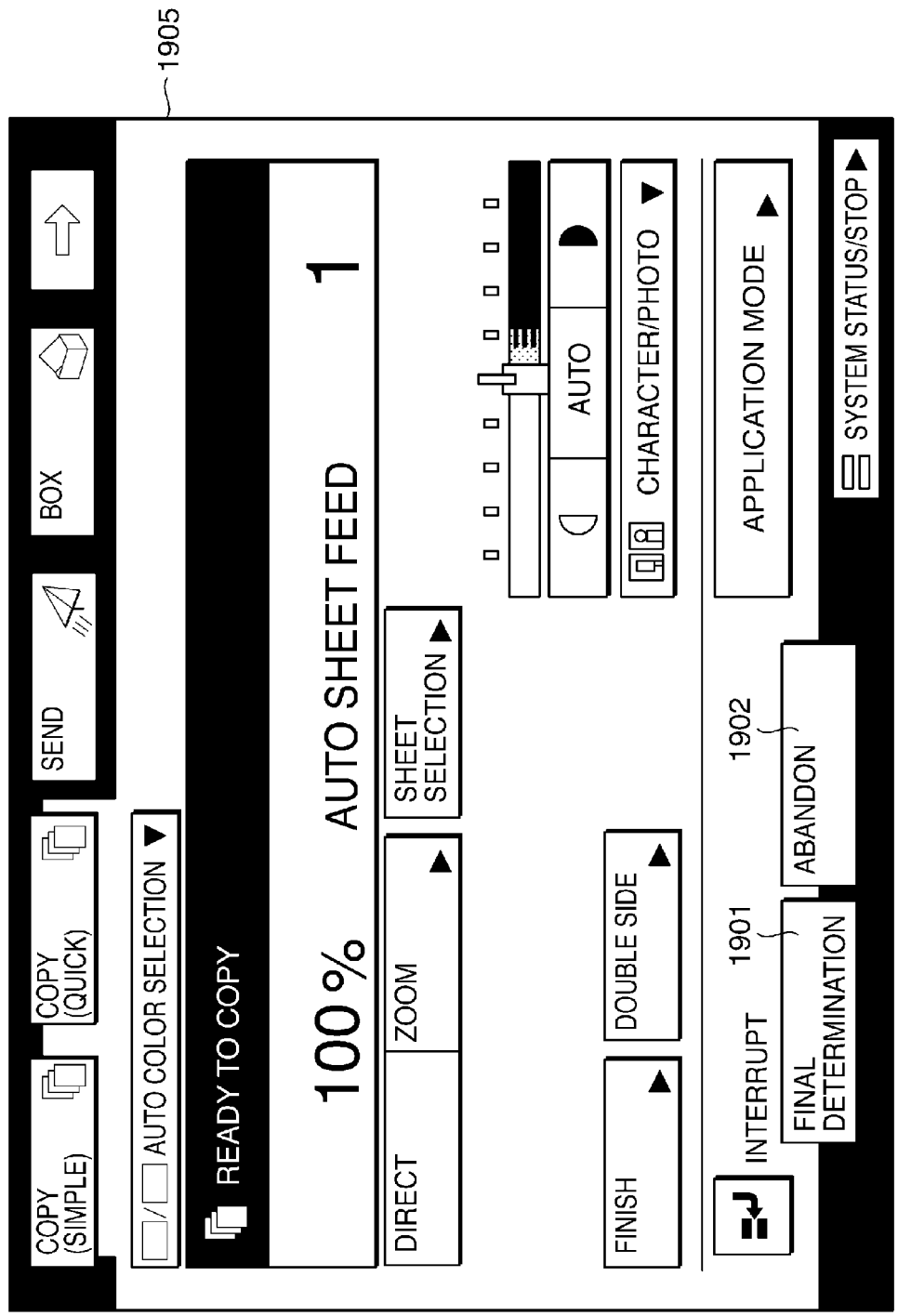

FIG.10B

| | REMOTE SCANNER | WEB BROWSER | PRINT | | HOLD | |
|---|---|---|---|---|---|---|

■ HOLD JOB LIST  SELECTION COUNT:0/12

| ✓ | JOB NAME | USER NAME | DATE/TIME |
|---|---|---|---|
| | 20060317091700 | user_name | 03/17 09:17 |
| | 20060321133124 | user_name | 03/21 13:31 |
| | 20060406192225 | user_name | 04/06 19:22 |
| | 20060406192237 | user_name | 04/06 19:22 |
| | 20060406192244 | user_name | 04/06 19:22 |
| | 20060406192251 | user_name | 04/06 19:22 |

◁ 1/2 ▶

2-SPLIT DISPLAY ▶

☐ DISPLAY ONLY SELECTED USER
▲ DETAILS/CHANGE
☐ FULL SELECTION (UP TO 100)
☐ DELETE AFTER PRINTING
START PRINTING ↵

1903 — FINAL DETERMINATION  ABANDON

■ PRINT JOB LIST  TOTAL WAITING TIME: MINUTES (ca.)

| ACCEPTANCE NUMBER | TIME | JOB NAME | STATUS | WAITING TIME |
|---|---|---|---|---|

◁ 1/2 ▽

▲ DETAILS/CHANGE
STOP ▲

≡ SYSTEM STATUS/STOP ▶

1906
1904

USER INTERFACE AND METHOD OF CONTROLLING THE SAME, STORAGE MEDIUM, AND IMAGE PROCESSING APPARATUS

BACKGROUND OF THE INVENTION

1. Field of the Invention

The present invention relates to a user interface (operation unit) having a plurality of configuration items, a method of controlling the same, a storage medium, and an image processing apparatus including the user interface.

2. Description of the Related Art

Conventionally, a multifunction peripheral (MFP) as an image processing apparatus has been configured such that details of settings for a job to be executed and settings for adjustment of the apparatus can be configured via an operation unit. The settings are roughly classified into two types: settings configured when executing a job, such as a copy job or a print job, and settings configured in advance before executing a job.

Taking a copy job by the MFP as an example, settings of the number of copies, a magnification, a sheet size, execution or non-execution of stapling, etc. are configured on a copy screen when executing the job.

On the other hand, settings of ON/OFF of an automatic sheet selection function, adjustment of stapling positions, adjustment of a page number printing position, and so forth are items to be set not when executing the job, but in advance before executing the job. Further, the items to be set in advance are configured not on the copy screen, but on a special screen called a user mode screen (see Japanese Patent Laid-Open Publication No. 2007-028105).

As described above, on the user mode screen for performing configuration of the apparatus in advance, it is possible to set various items. Job type-specific adjustment values (image quality, etc.), adjustment values (staple positions, etc.) for the device (apparatus), and device-specific information (an IP address, etc.) can be set on the user mode screen, and hence the number of configuration items tend to increase as the numbers of job types and device functions increase.

For this reason, in a recent MFP, it is very difficult to find a desired configuration item from the user mode screen.

Further, some of the items configurable in the user mode suffer from the inconvenience that their values set on the user mode screen are sometimes nullified depending on application mode settings configured when executing a job. However, the information cannot be visually notified to a user, and therefore the user has no alternative but to know it by experience.

Furthermore, settings configured in the user mode are stored in the main unit of the MFP, and hence they sometimes affect all jobs. The settings cannot be made after verification of adequacy of the configuration. Therefore, if a job is input during configuration of the settings, it is sometimes impossible to perform normal printing.

SUMMARY OF THE INVENTION

The present invention provides a user interface which makes it possible to easily and more accurately configure a user mode and a method of controlling the user interface, a storage medium, and an image processing apparatus including the user interface.

In a first aspect of the present invention, there is provided a user interface having an application mode configuration screen for configuring settings for an application mode when executing a job and a user mode configuration screen for configuring settings for a user mode before executing the job, comprising a determination unit adapted to be operable when the user mode configuration screen is to be displayed, to determine whether or not the application mode configuration screen is being displayed, and a display unit adapted to be operable when the determination unit determines that the application mode configuration screen is being displayed, to display user mode items related to settings to be configured for the application mode on the application mode configuration screen being displayed.

In a second aspect of the present invention, there is provided a method of controlling a user interface having an application mode configuration screen for configuring settings for an application mode when executing a job and a user mode configuration screen for configuring settings for a user mode before executing the job, comprising determining, when the user mode configuration screen is to be displayed, whether or not the application mode configuration screen is being displayed, and displaying, when it is determined in the determining that the application mode configuration screen is being displayed, user mode items related to settings to be configured for the application mode on the application mode configuration screen being displayed.

In a third aspect of the present invention, there is provided a storage medium storing a program for causing a computer to execute a method of controlling a user interface having an application mode configuration screen for configuring settings for an application mode when executing a job and a user mode configuration screen for configuring settings for a user mode before executing the job, wherein the method comprises determining, when the user mode configuration screen is to be displayed, whether or not the application mode configuration screen is being displayed, and displaying, when it is determined in the determining that the application mode configuration screen is being displayed, user mode items related to settings to be configured for the application mode on the application mode configuration screen being displayed.

In a fourth aspect of the present invention, there is provided an image processing apparatus including a user interface having an application mode configuration screen for configuring settings for an application mode when executing a job and a user mode configuration screen for configuring settings for a user mode before executing the job, comprising a determination unit adapted to be operable when the user mode configuration screen is to be displayed, to determine whether or not the application mode configuration screen is being displayed, and a display unit adapted to be operable when the determination unit determines that the application mode configuration screen is being displayed, to display user mode items related to settings to be configured for the application mode on the application mode configuration screen being displayed.

In a fifth aspect of the present invention, there is provided a user interface comprising a first configuration unit adapted to configure necessary settings when executing a job, a second configuration unit adapted to configure necessary settings before executing the job, and a display unit adapted to display configurable attributes, wherein the first configuration unit includes an input unit adapted to enable one attribute to be selected from a list of attributes displayed on the display unit, and an attribute value thereof to be set, and wherein the second configuration unit includes a control unit adapted to cause the display unit to display items configurable by the second configuration unit during execution of configuration by the first configuration unit, and controlling the number of items which can be configured, in a manner interlocked with conditions of configuration being executed by the first configuration unit.

According to the user interface of the present invention, it is possible to easily and more accurately configure the user mode.

Further features of the present invention will become apparent from the following description of an exemplary embodiment (with reference to the attached drawings).

BRIEF DESCRIPTION OF THE DRAWINGS

FIG. 1 is a block diagram of a multifunction peripheral (MFP) as an example of an image processing apparatus according to an embodiment of the present invention.

FIG. 2 is a block diagram showing the hardware configuration of a controller appearing in FIG. 1 and units connected to the controller.

FIGS. 5A-1 to 5A-3 are views of examples of screens displayed on a liquid crystal display appearing in FIG. 4.

FIGS. 5B-1 to 5B-3 are views of examples of screens displayed on the liquid crystal display.

FIGS. 5C-1 to 5C-3 are views of examples of screens displayed on the liquid crystal display.

FIGS. 5D-1 and 5D-2 are views of examples of screens displayed on the liquid crystal display.

FIGS. 6A and 6B are views of examples of screens displayed on the liquid crystal display when a user mode key appearing in FIG. 4 is pressed.

FIGS. 10A and 10B are views of examples of screens displayed on the liquid crystal display in a case where a pending flag has been set in the user mode process shown in FIGS. 7A and 7B.

DETAILED DESCRIPTION OF THE EMBODIMENTS

The present invention will now be described in detail below with reference to the accompanying drawings showing embodiments thereof.

Figures 1, 5A:
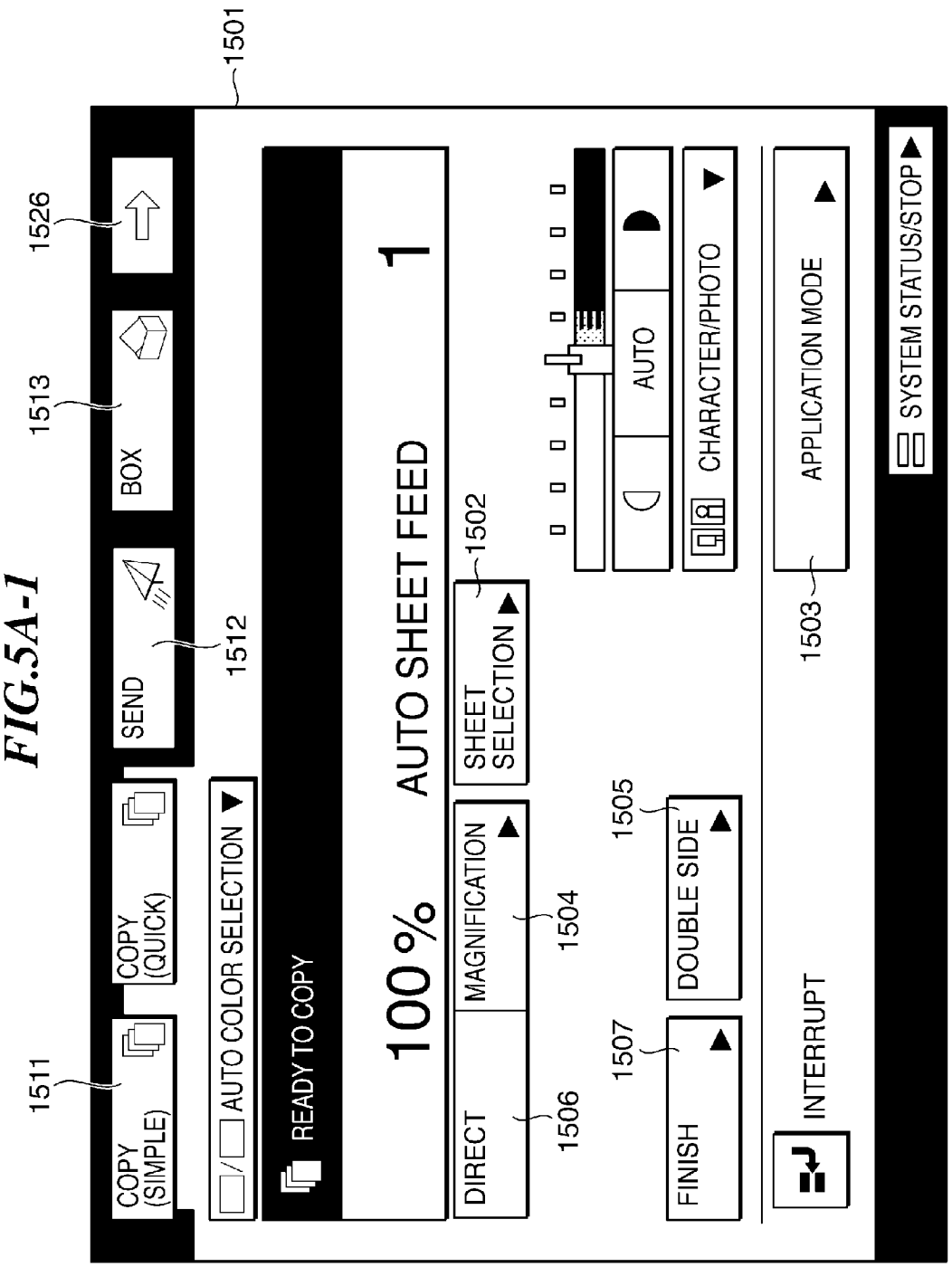

FIG. 1 is a block diagram of a multifunction peripheral (MFP) as an example of the image processing apparatus according to the embodiment of the present invention.

Referring to FIG. 1, a controller 101 for controlling the MFP has hardware configuration which is described hereinafter with reference to FIG. 2. A scanner 102 is controlled by the controller 101. A printer engine 103 is also controlled by the controller 101.

The printer engine 103 is connected to a finisher 104 which is capable of collectively post-processing (e.g. stapling, punching, etc.) of a plurality of sheets output from the printer engine 103. The finisher 104 is also controlled by the controller 101.

A network (Ethernet (registered trademark)) interface 105 enables the controller 101 to perform interactive communication therethrough.

An operation unit 106 as a user interface is comprised of an LCD display and a keyboard. The operation unit 106 displays information from the controller 101 and transfers instructions from the user to the controller 101. Further, all the functions of the operation unit 106 can be used by an external apparatus on a network (Ethernet (registered trademark) and TCP/IP) via the network interface 105.

Figures 2, 5A:
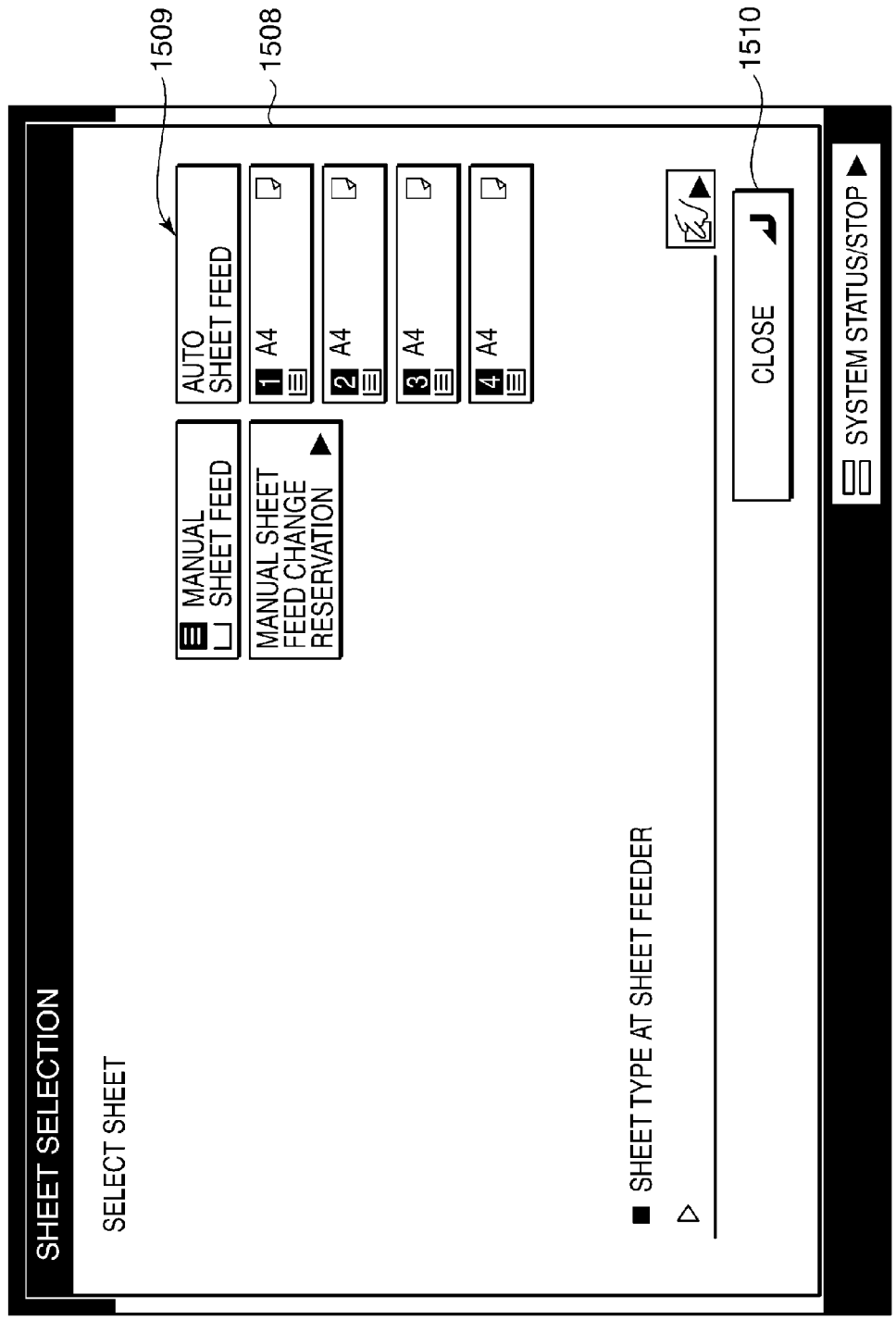

FIG. 2 is a block diagram of the hardware configuration of the controller appearing in FIG. 1 and units connected to the controller.

Referring to FIG. 2, the controller 101 is comprised of a CPU 201, a memory 202, a ROM 205, and a disk (storage medium) 206, which are interconnected by a bus 207. Further, the CPU 201 is connected, by the bus 207, to a liquid crystal display 203 and a keyboard 204 forming the operation unit 106.

Various programs and data are stored in the disk 206 implemented e.g. by a hard disk or a floppy (registered trademark) disk, and are sequentially read out into the memory 202 and executed by the CPU 201, on an as-needed basis.

The disk 206 may be removably attached to the MFP or may be incorporated therein. Further, a program may be downloaded from another MFP via a network and be stored in the disk 206.

Memories are classified into nonvolatile memories, such as a DRAM, and volatile memories, such as an SRAM. The memory 202 may have both the function of a volatile memory and that of a nonvolatile memory, or alternatively, the two functions may be assigned to the memory 202 and the disk 206, respectively.

The liquid crystal display 203 and the keyboard 204 form the operation unit 106 appearing in FIG. 1. The CPU 201 performs control such that data is displayed on the liquid crystal display 203, and instructions input by the user via the keyboard 204 or the liquid crystal display 203 are received as information.

The received information is transferred to one of the memory 202, the disk 206, and the CPU 201 and is stored therein for use in various processes.

The network interface 105 is connected to the bus 207. The CPU 201 reads or writes data from/in the network interface 105 to thereby perform communication using the interface.

Further, connected to the bus 207 are the scanner 102, the printer engine 103, and the finisher 104, and the CPU 201 reads/writes data from/in each of these units to thereby cause a scanning or printing engine operation to be executed and acquire various statuses.

It should be noted that the scanner 102, the printer engine 103, and the finisher 104 may exist on the network as respective independent peripheral apparatuses instead of being provided within the MFP, and the controller 101 of the MFP may control them.

Figure 3:
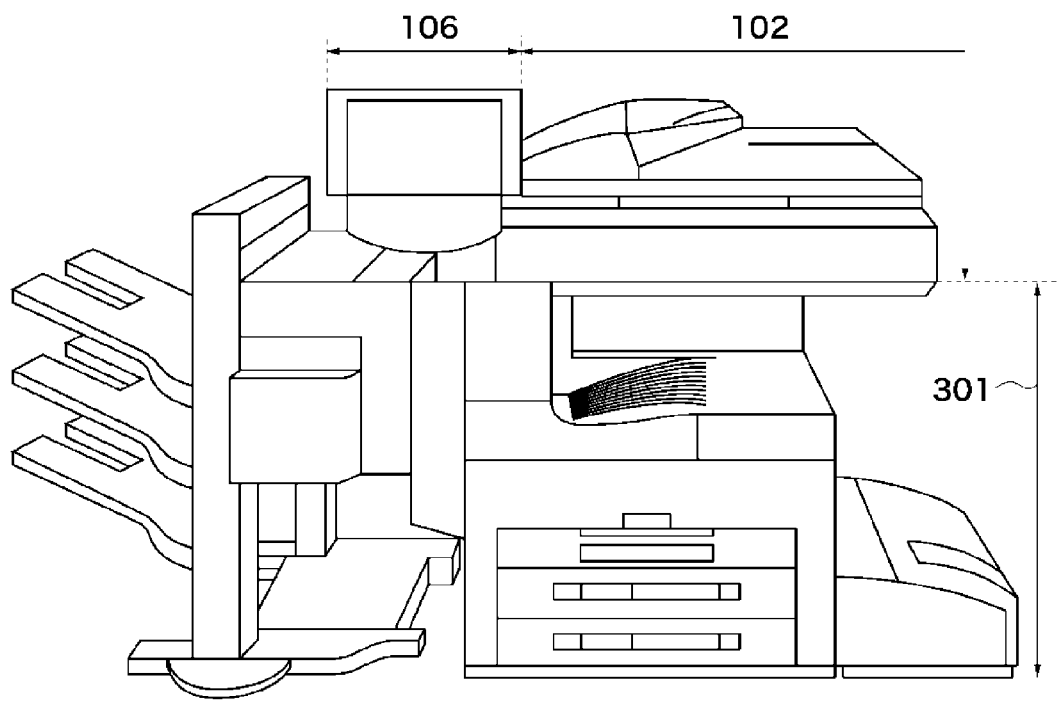
FIG. 3 is a perspective view of the appearance of the MFP in FIG. 1.

FIG. 3 is a perspective view of the appearance of the MFP in FIG. 1.

Referring to FIG. 3, the scanner 102 as an image input device illuminates an image on an original and scans the image by CCD line sensors to thereby convert reflected light from the original into electric signals as image data (raster image data).

A printer unit 301 including the printer engine 103, which functions as an image output device, converts the raster image data into an image on a sheet. A print operation is started or stopped by an instruction from the CPU 201.

Figure 4:
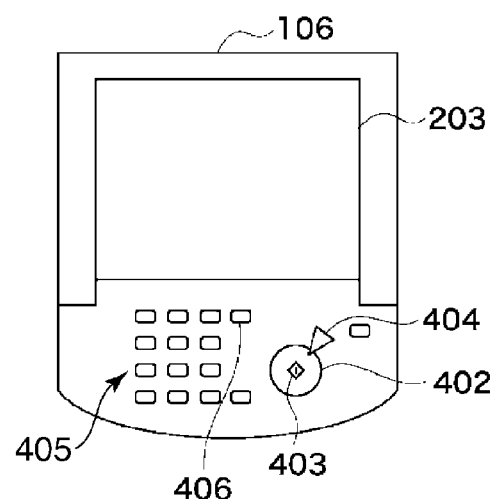
FIG. 4 is a view of the arrangement of an operation unit appearing in FIG. 3.

FIG. 4 is a view of the arrangement of the operation unit appearing in FIG. 3.

Referring to FIG. 4, the liquid crystal display 203 (see FIG. 2 as well) has a touch panel sheet affixed thereon, and displays system operation screens and soft keys on the touch panel sheet. Further, when a key displayed on the touch panel sheet is pressed, the liquid crystal display 203 sends associated position information to the CPU 201.

A start key 402 as a component of the keyboard 204 (see FIG. 2) is used e.g. to start an original image reading operation. The start key 402 has a two-color LED 403 of green and red disposed on a central portion thereof, and the LED 403 indicates by its color whether or not the start key 402 is in an operable state.

A stop key 404 is operated to stop an operation of the MFP in progress. A ten key pad 405 is formed by a button group comprised of numerical buttons and character buttons. The ten key pad 405 is used e.g. to set the number of copies or give an instruction for switching one screen to another on the liquid crystal display 203. A user mode key 406 is pressed to configure settings for the apparatus.

FIGS. 5A-1 to 5D-2 are views of examples of screens displayed on the liquid crystal display 203 appearing in FIG. 4.

A screen 1501 shown in FIG. 5A-1 is a copy job configuration screen which is displayed as an initial screen when the MFP is started. When a sheet selection button 1502 is pressed, the screen 1501 is switched to a screen 1508 shown in FIG. 5A-2. On the screen 1508, it is possible to select one of sheet feed cassettes for execution of image processing.

Cassette selection buttons 1509 are used to designate a mode for automatically selecting a sheet feed cassette, or designate one of sheet feed cassettes selected for use. When a close button 1510 is pressed, the screen 1508 is switched back to the screen 1501.

When an application mode button 1503 appearing in FIG. 5A-1 is pressed, the screen 1501 is switched to a screen 1514 shown in FIG. 5A-3. On the screen 1514, it is possible to configure various image processing modes.

Figures 1, 5B:
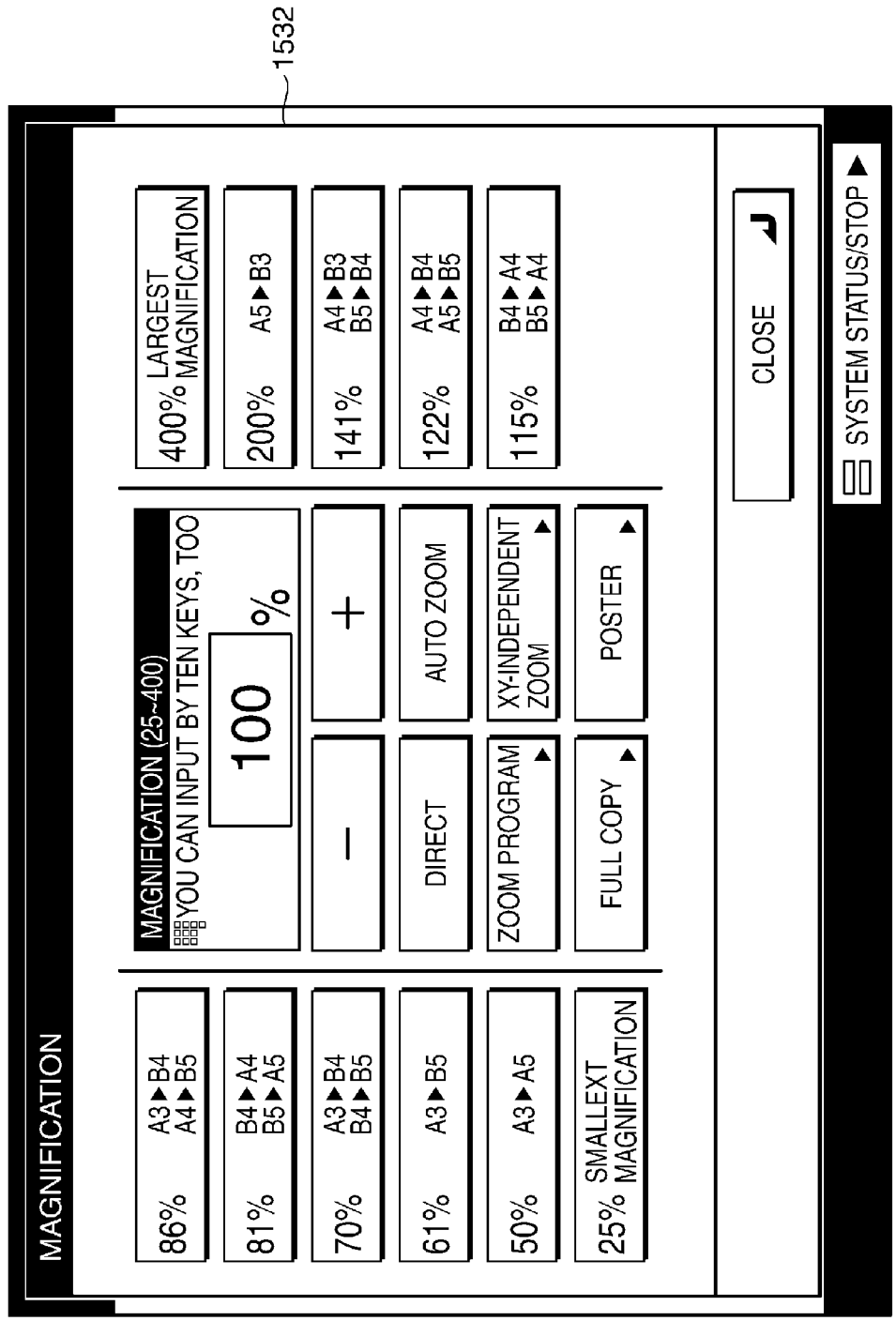
Figures 2, 5B:
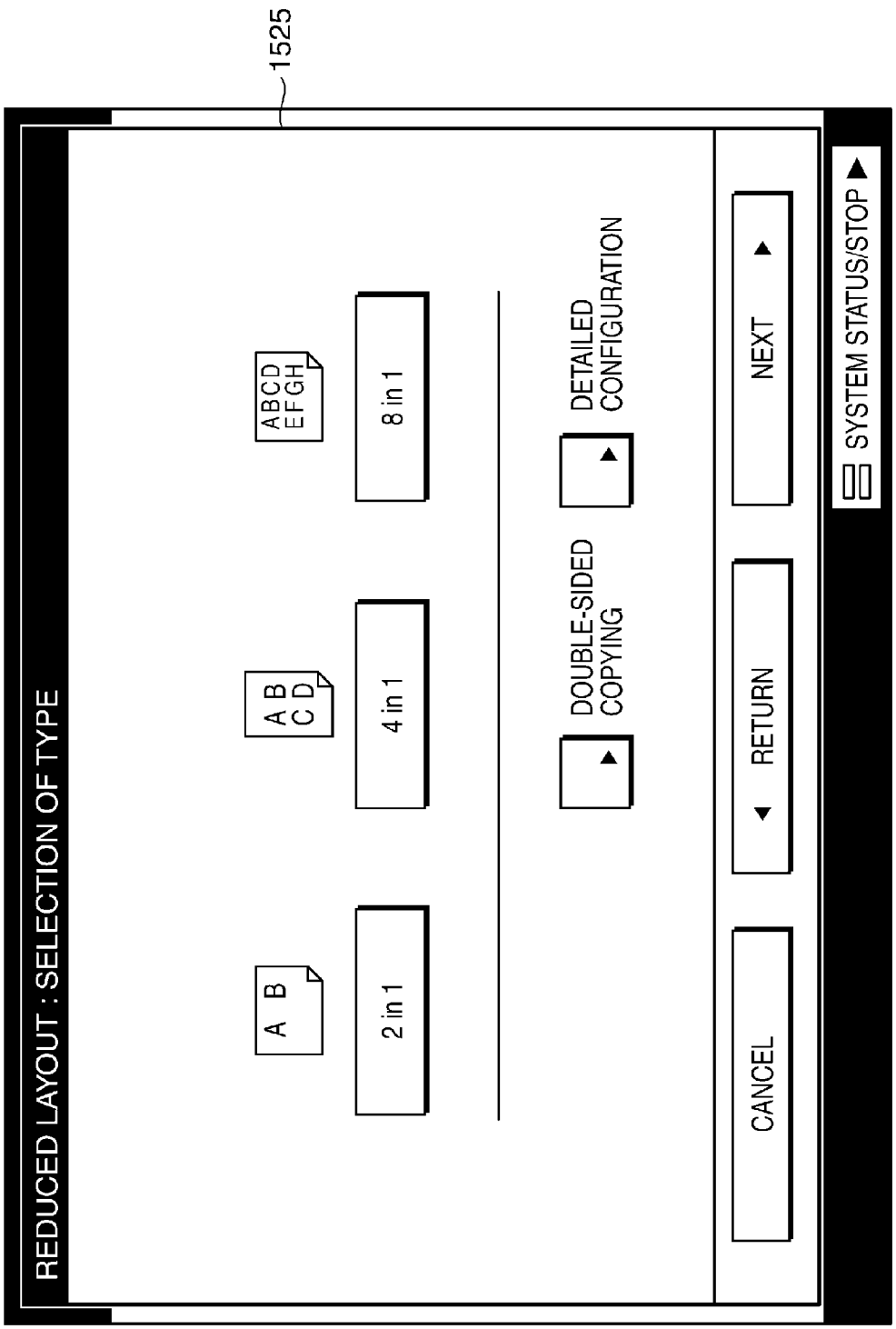
Figures 3, 5B:
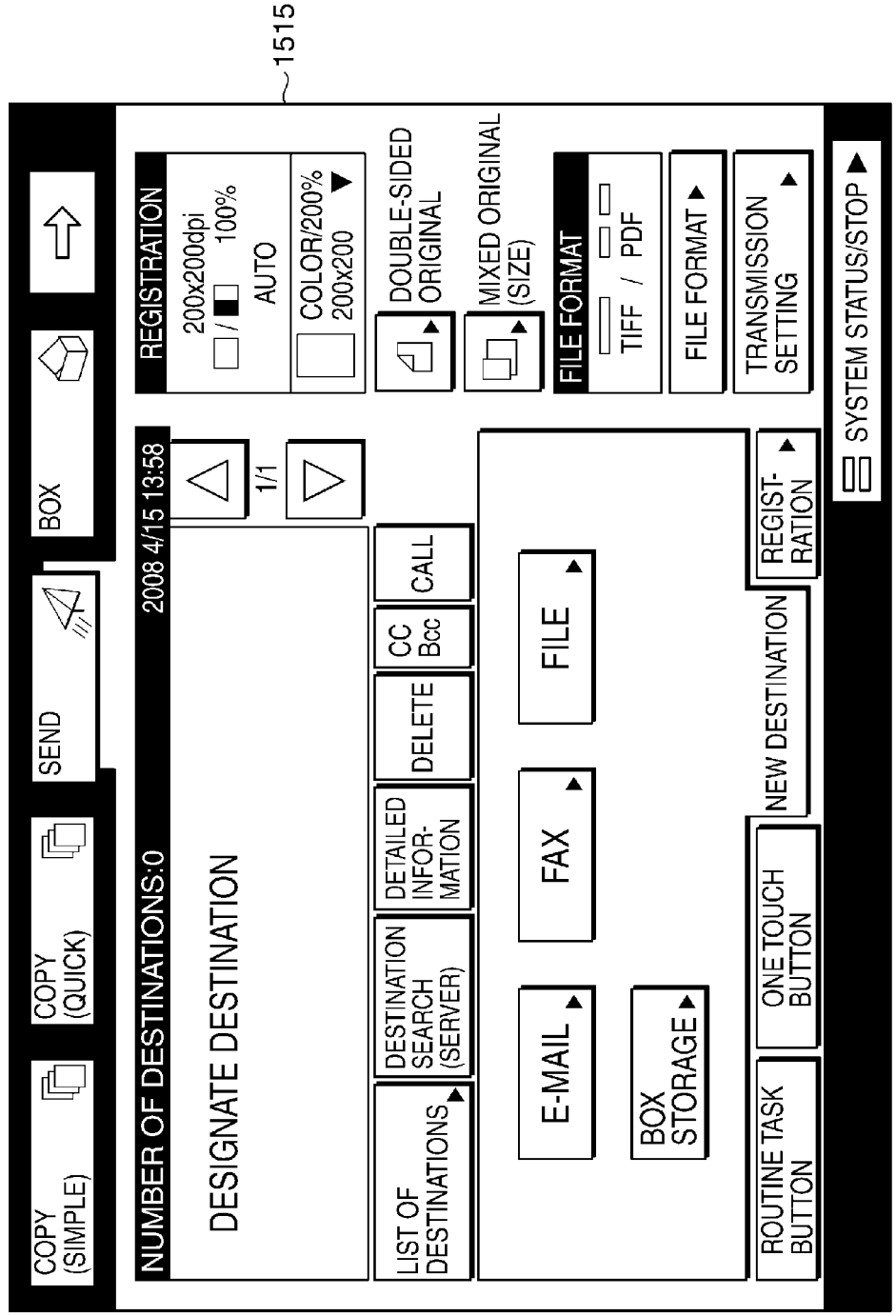

A screen 1525 shown in FIG. 5B-2 is displayed when a reduced layout button on the screen 1514 is pressed. On the screen 1525, it is possible to configure detailed settings for reduced layout.

When a magnification button 1504 appearing in FIG. 5A-1 is pressed, a magnification setting screen 1532 shown in FIG. 5B-1 is displayed. On the screen 1532, it is possible to set a magnification.

By pressing a double side button 1505 appearing in FIG. 5A-1, it is possible to set a double-sided copy mode. When a direct button 1506 is pressed, the magnification is set to 100%. A finish button 1507 is pressed to set a stapling sorting mode, a group sorting mode, or the like mode.

Figures 1, 5C:
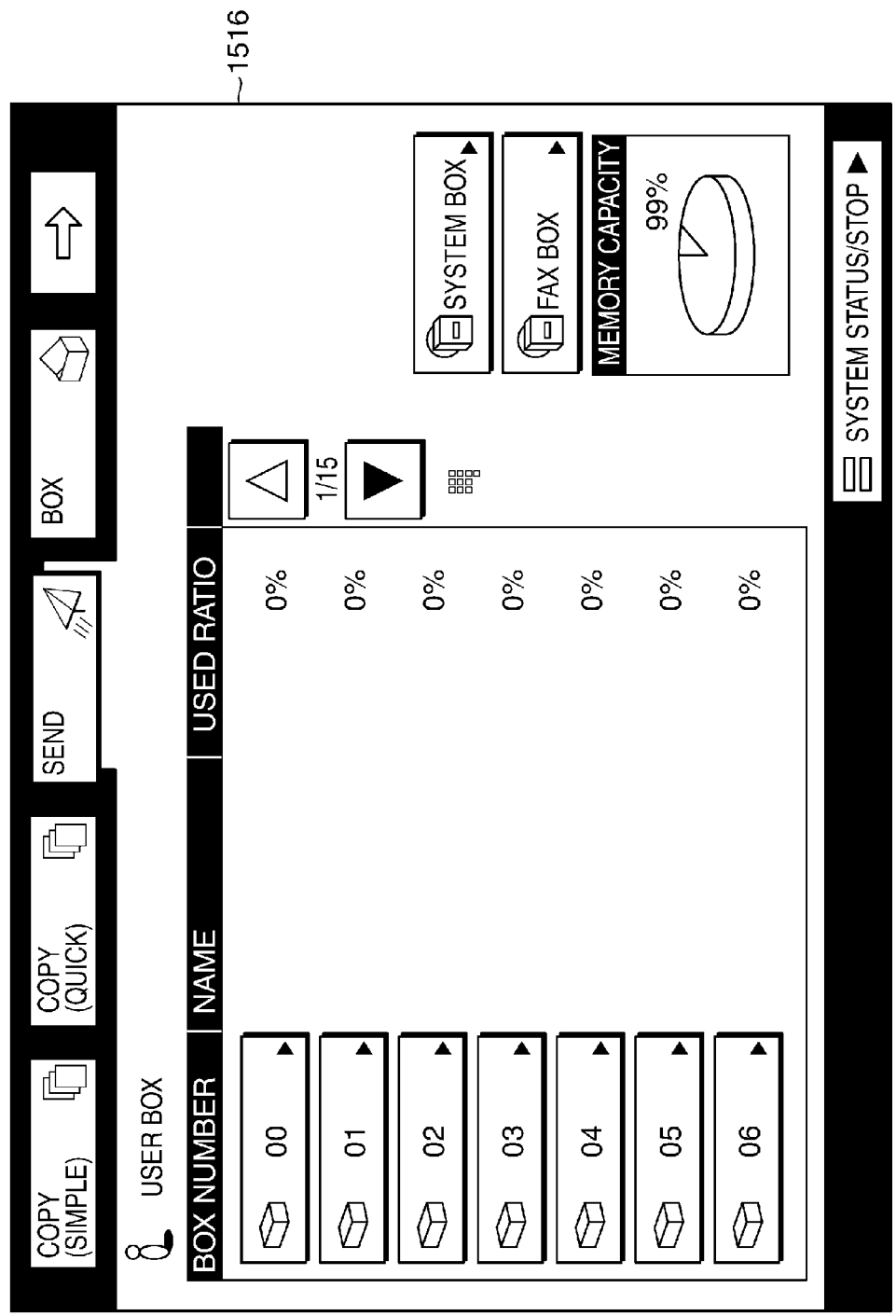
Figures 2, 5C:
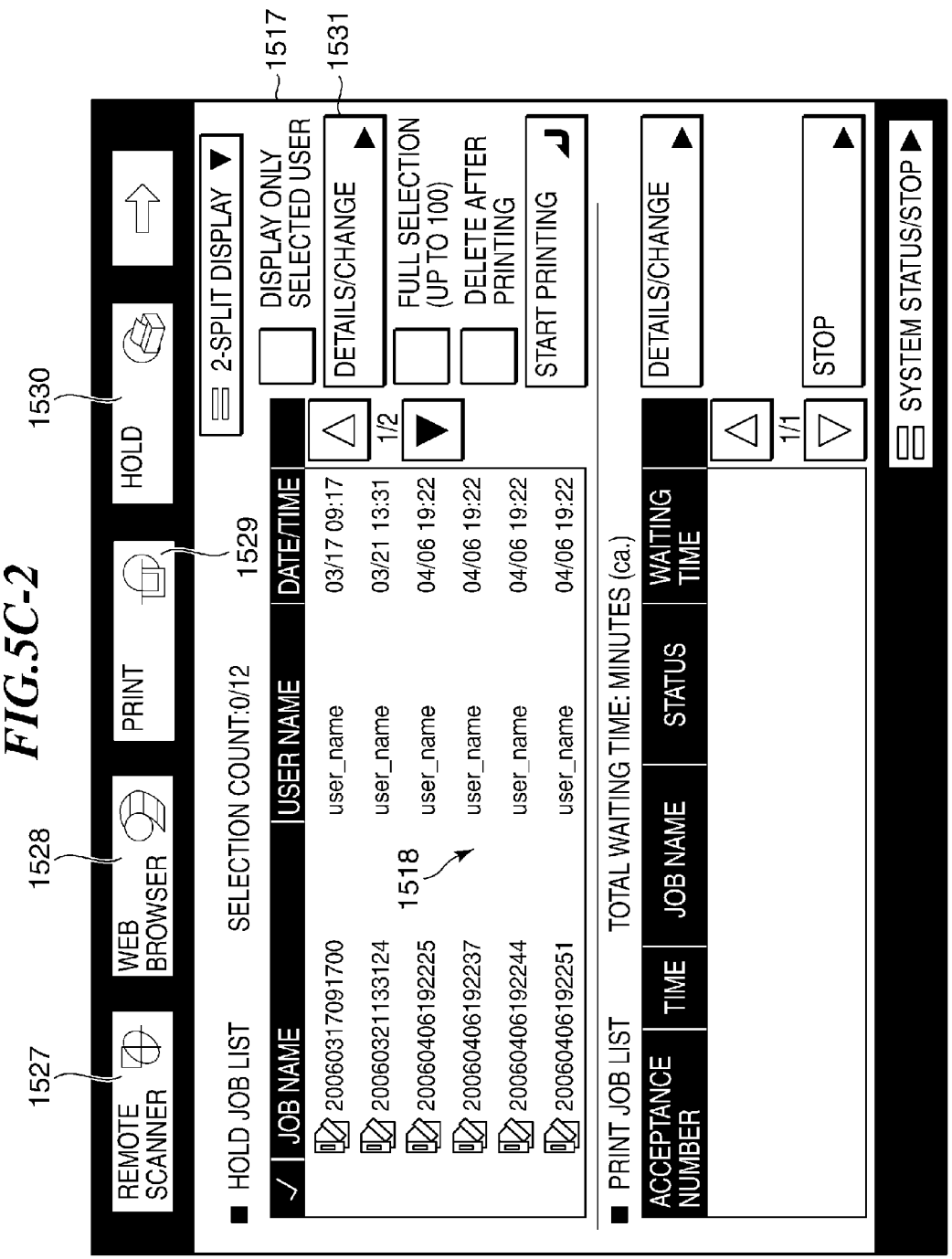

Further, by pressing one of tabs 1511, 1512, 1513, and 1526 appearing in FIG. 5A-1, and tabs 1527, 1528, 1529, and 1530 appearing in FIG. 5C-2, it is possible to switch a job type displayed on the screen.

When the tab 1512 is pressed, a send screen 1515 shown in FIG. 5B-3 is displayed, while when the tab 1513 is pressed, a box screen 1516 shown in FIG. 5C-1 is displayed.

When the arrow button 1526 appearing in FIG. 5A-1 is pressed, a hold job screen 1517 shown in FIG. 5C-2 is displayed as a next page. By pressing one of the tabs 1527, 1528, and 1529 on the hold job screen 1517, it is possible to display a screen associated with another different job type, but description thereof is omitted.

Now, the hold job screen will be described as a screen associated with another job type.

Print jobs 1518 yet to be printed out are displayed as a list in a central area of the screen 1517. When one job is selected from the list and a setting change button 1531 is pressed, a screen 1519 shown in FIG. 5C-3 is displayed.

Figures 1, 5D:
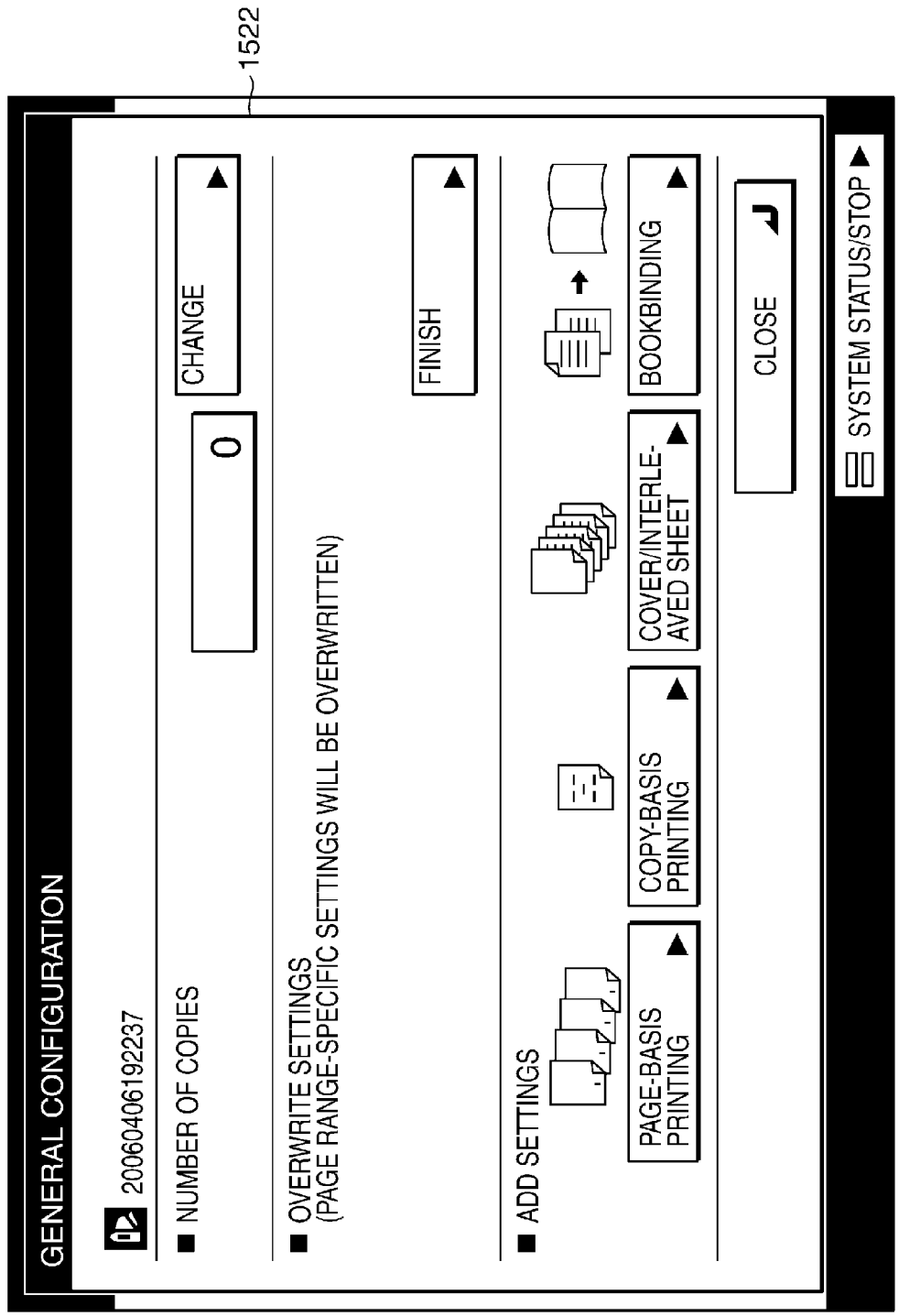
Figures 2, 5D:
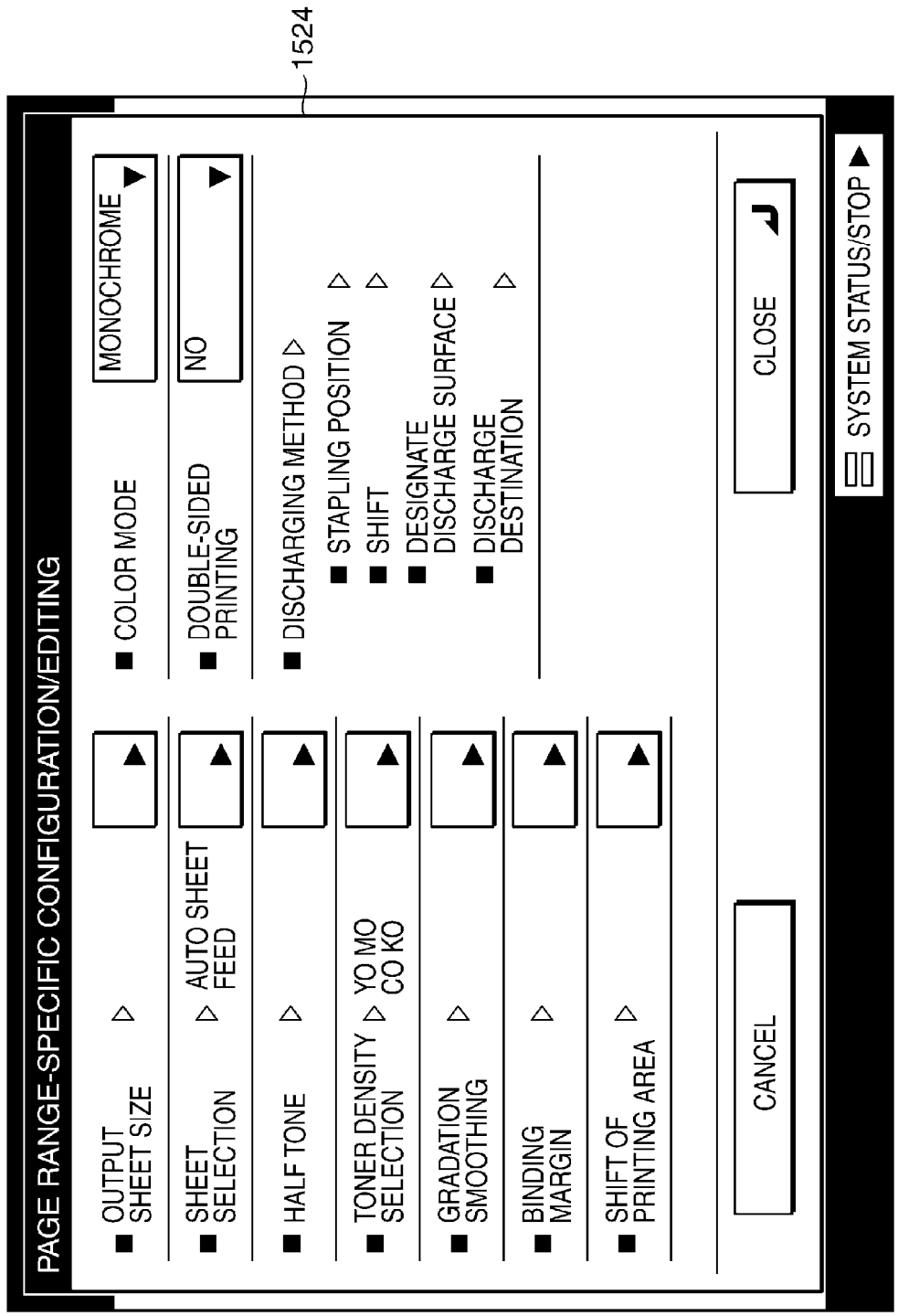

The screen 1519 includes an edit button 1520 for enabling editing of an entire job and an edit button 1521 for enabling editing of a job on a page range basis When the edit button 1520 is pressed, a screen 1522 shown in FIG. 5D-1 is displayed to enable configuration of attributes to be set for the entire job. When the edit button 1521 is pressed, a screen 1524 shown in FIG. 5D-2 is displayed to enable configuration on a page range basis.

Each of the screens shown in FIGS. 5A-1 to 5D-2 can be defined as an application mode configuration screen to be used for configuring an application mode at the start of job execution.

Further, the screens shown in FIGS. 5A-1 to 5D-2 function as a configuration unit for configuring necessary settings when executing a job. These are an example of a first configuration unit of the present invention. As described hereinabove, these screens are used for displaying a list of configurable attributes so as to enable the user to select one attribute from the listed attributes and set a value of the selected attribute.

Figure 6A:
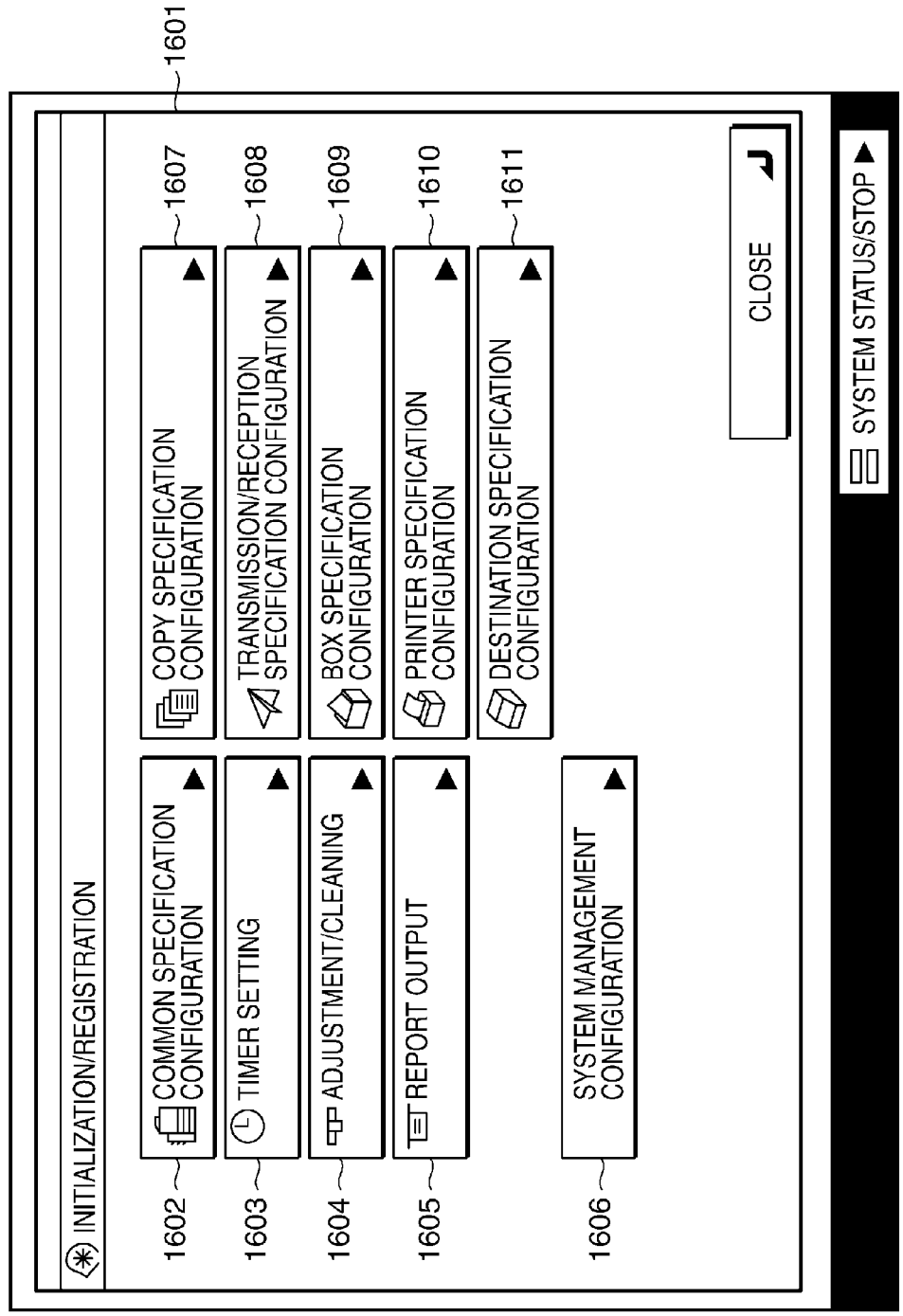

FIGS. 6A and 6B are views of examples of screens displayed on the liquid crystal display when the user mode key 406 appearing in FIG. 4 is pressed.

When a screen 1601 shown in FIG. 6A is displayed, it is possible to configure settings for the MFP on the screen 1601. A common specification configuration button 1602 is pressed to configure settings common to all job types. A timer setting button 1603 is pressed to set a sleep timer mode or the like.

An adjustment/cleaning button 1604 is pressed to cause the MFP to carry out image adjustment or cleaning. A report output button 1605 is pressed to output a job history. A system management configuration button 1606 is pressed for a system administrator to configure settings permitted for him.

A copy specification configuration button 1607 is pressed to configure settings specifically for copying. A transmission/reception specification configuration button 1608 is pressed to configure settings specifically for transmission/reception. A box specification configuration button 1609 is pressed to configure settings specifically for a box job.

A printer specification configuration button 1610 is pressed to configure settings specifically for the printer. A destination specification configuration button 1611 is pressed to configure settings for a destination.

FIG. 6B shows a screen 1612 displayed when the common specification configuration button 1602 is pressed.

On the screen 1612, it is possible to configure settings common to all jobs by pressing one of buttons belonging to a button group 1614. Further, by operating one of buttons 1613, it is possible to change pages. Thus, it is possible to configure various settings.

The screens shown in FIGS. 6A and 6B can be defined as a user mode configuration screen for configuring a user mode before executing a job.

Further, the screens shown in FIGS. 6A and 6B function as a configuration unit for configuring necessary settings before executing a job. This configuration unit is an example of a second configuration unit of the present invention. In the present embodiment, however, if an instruction for displaying the user mode configuration screen is issued during execution of configuration by the first configuration unit, a different screen from the screen 1601 shown in FIG. 6A is displayed.

More specifically, not the general user mode screen, but only configuration items related to an item for which configuration has been executed by the first configuration unit are displayed in a manner interlocked with the item.

Figure 7A:
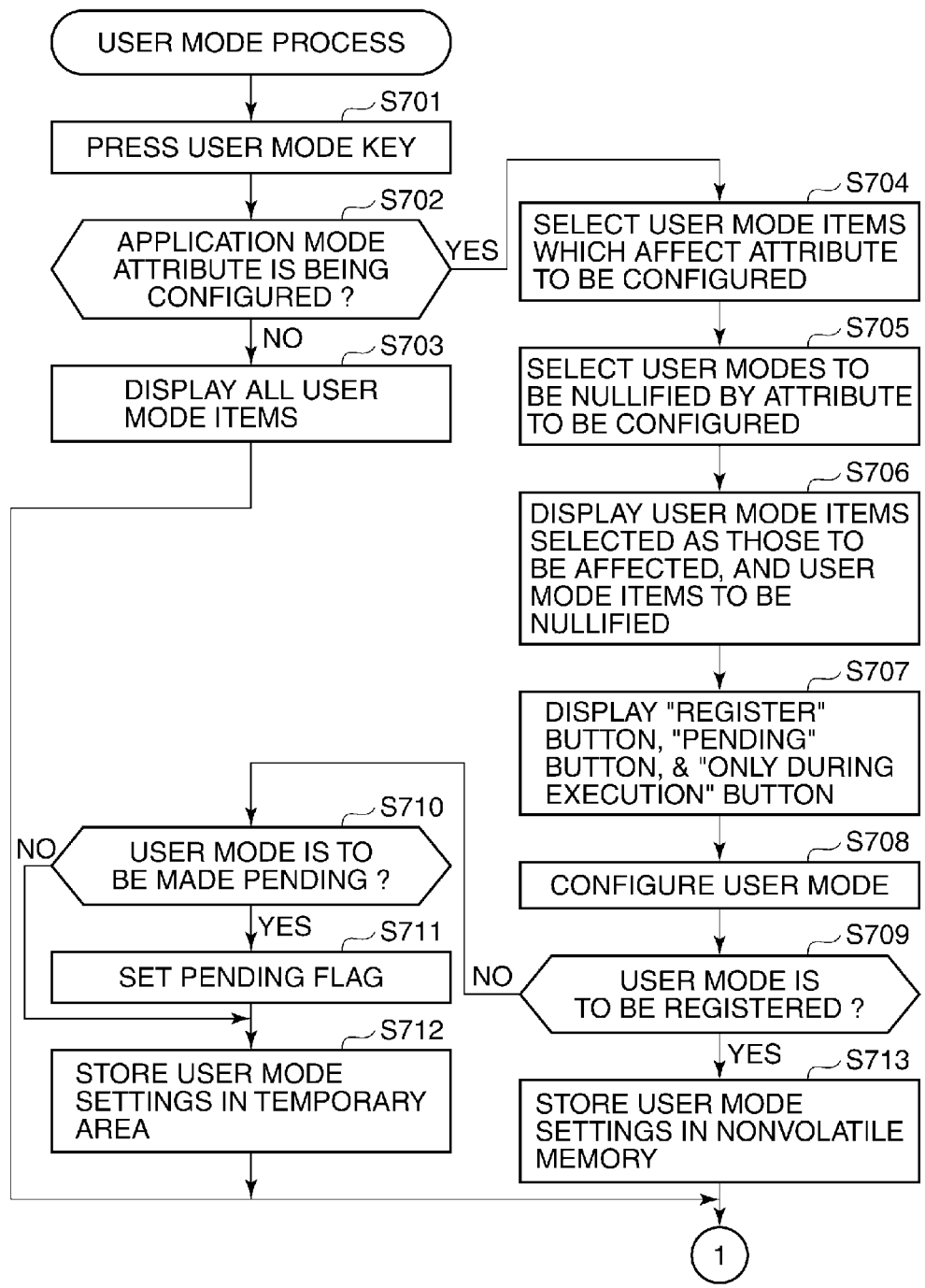
FIG. 7A is a flowchart of a user mode process executed by the MFP in FIG. 1.
Figure 7B:
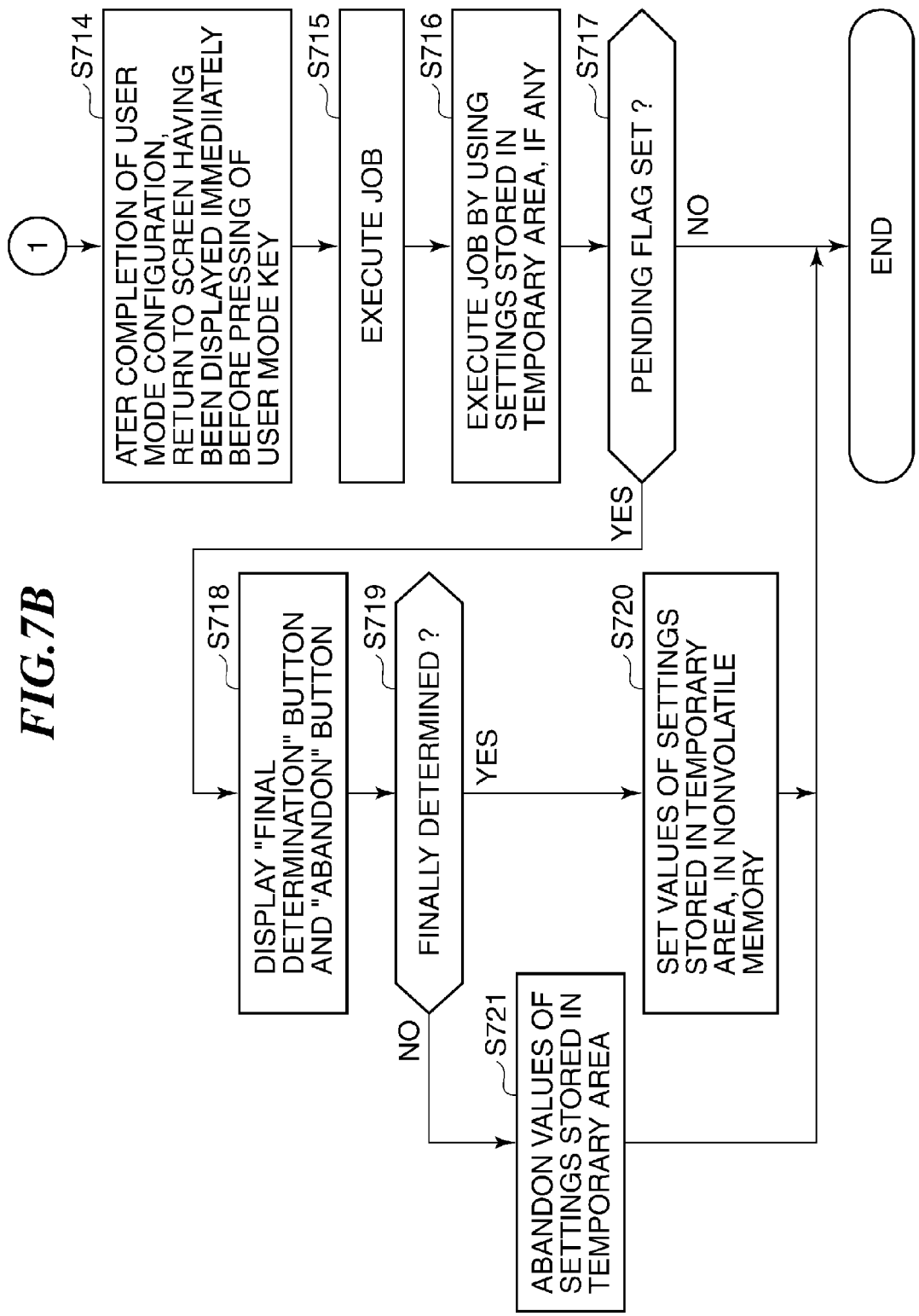
FIG. 7B is a continuation of FIG. 7A.

FIGS. 7A and 7B are a flowchart of a process executed by the FIG. 1 MFP in the present embodiment.

The present process is executed under the control of the CPU 201 appearing in FIG. 2.

Referring to FIG. 7A, when the user mode key 406 is pressed in a step S701, the CPU 201 determines in a step S702 whether or not an application mode configuration screen has been displayed on the liquid crystal display 203.

If the application mode configuration screen has not been displayed, the process proceeds to a step S703, wherein the CPU 201 causes the liquid crystal display 203 to display the screen 1601 thereon such that all user mode items can be accessed. The case where the application mode configuration screen is not displayed is e.g. a case where the screen 1501 or 1517 is displayed.

If it is determined in the step S702 that the application mode is being configured, the CPU 201 searches for user mode items which affect currently displayed configurable attributes. The case where the application mode is being configured is e.g. a case where the screen 1514, 1522, or 1524 is being displayed.

That is, in a step S704, the CPU 201 selects user mode items which affects the attributes configurable on the currently displayed screen.

In a step S705, the CPU 201 searches for user mode settings which will be nullified by an attribute configurable on the currently displayed screen. When there are a plurality of attributes displayed at this time, an attribute to be set is not determined, and hence user mode settings which will be nullified are not search for. On the other hand, when a single attribute is being displayed, the search is performed.

It should be noted that the relationships between application mode attributes and user mode items are recorded on the disk 206, and the steps S704 and S705 are executed based on the recorded information.

In a step S706, the CPU 201 causes the liquid crystal display 203 to display thereon the user mode items selected in the step S704 and the user mode items found to be nullified in the step S705.

Let it be assumed, for example, that the screen 1514 is being displayed. In this case, if the user mode key 406 is pressed, there is displayed a screen shown in FIG. 8 as results of execution of the steps S704, S705, and S706. As the screen displayed as the results execution of the steps S704, S705, and S706, as in FIG. 8, a user mode screen related to the copy job alone is displayed instead of the screen 1601 in FIG. 6A.

Since there are a plurality of attributes displayed on the screen 1514, user mode items to be nullified are not displayed.

Figure 9:
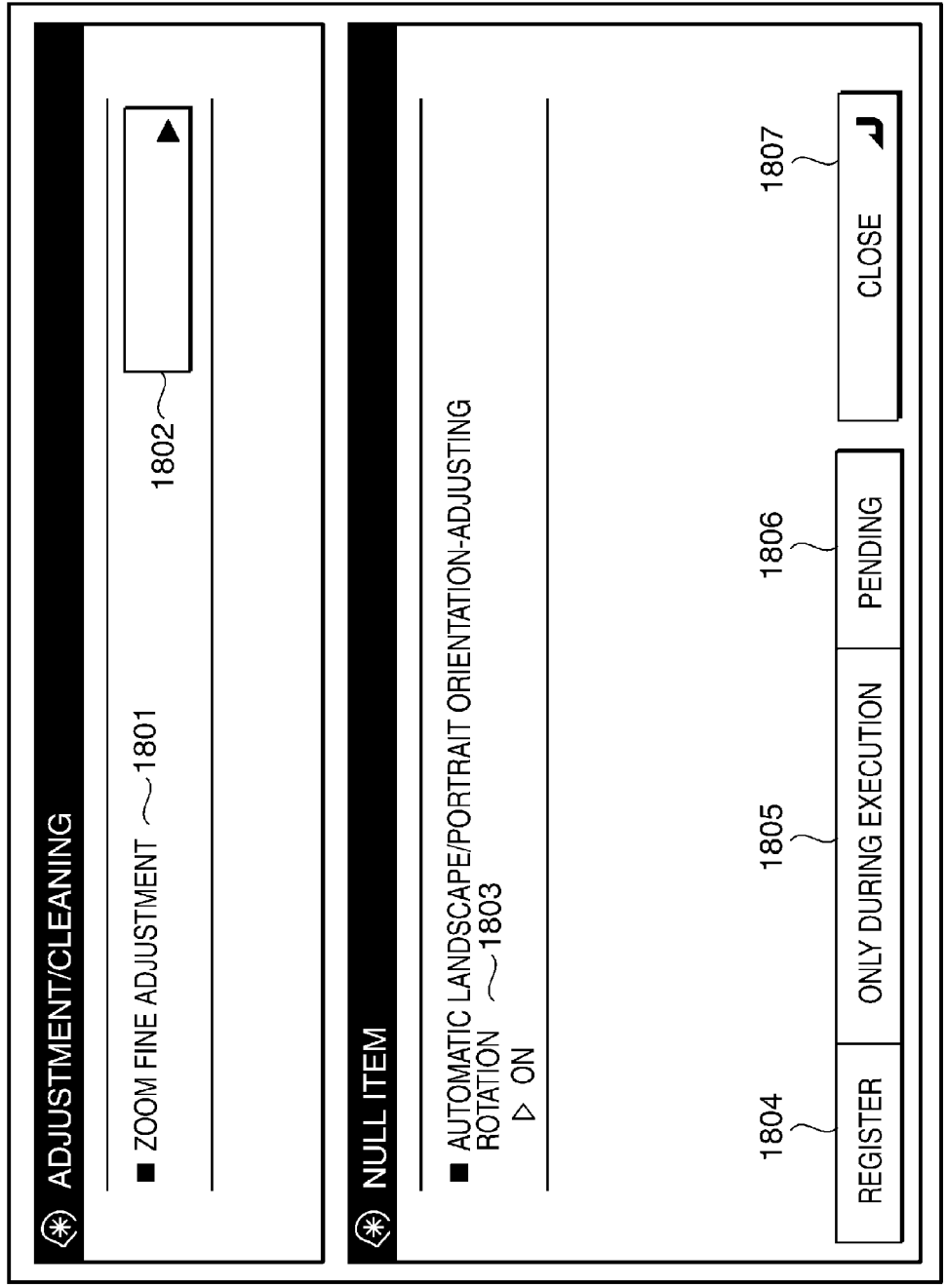
FIG. 9 is a view of an example of a screen displayed on the liquid crystal display when the user mode key appearing in FIG. 4 is pressed in a case where the screen shown in FIG. 5B-2 has been displayed.

Further, assuming that the screen 1525 is being displayed, if the user mode key 406 is pressed, a screen shown in FIG. 9 comes to be displayed. The screen 1525 is for configuring an attribute called reduced layout, for performing optimal image rotation for layout based on a zoom configuration, and therefore when the user mode key 406 is pressed, a zoom-related user mode configuration 1801 for zoom fine adjustment appears in the screen displayed as shown in FIG. 9. When a button 1802 is pressed on this screen, the zoom fine adjustment is enabled.

The screen 1525 is used to configure the single attribute of reduced layout and hence in the step S705, the CPU 201 searched for user mode items to be nullified. Therefore, an attribute of automatic landscape/portrait orientation-adjusting rotation found as a user mode item to be nullified is displayed as a nullified item 1803.

Thus, user mode items are narrowed down depending on conditions of an application mode screen displayed before depression of the user mode key 406, whereby user visibility and operability are improved.

In a step S707, the CPU 201 causes the liquid crystal display 203 to display thereon buttons for designating "pending", "only during execution", and "register", respectively. Reference numerals 1804, 1805, and 1806 in FIGS. 8 and 9 denote the respective buttons.

The CPU 201 configures a user mode in a step S708, and determines in a step S709 whether or not to register the user mode. If the "register" button 1804 appearing in FIG. 8 or 9 is pressed, the CPU 201 stores settings for the user mode in the nonvolatile memory (e.g. the disk 206 or the memory 202) in a step S713.

If the "register" button 1804 is not pressed, the CPU 201 checks in a step S710 whether to make the configured user mode pending. If the "pending" button 1806 has been pressed, the CPU 201 sets a pending flag in a step S711 and then stores the settings for the user mode in the volatile memory of the memory 202 in a step S712. If the "only during execution" button 1805 has been pressed in the step S710, the CPU 201 also executes the step S712.

Figure 8:
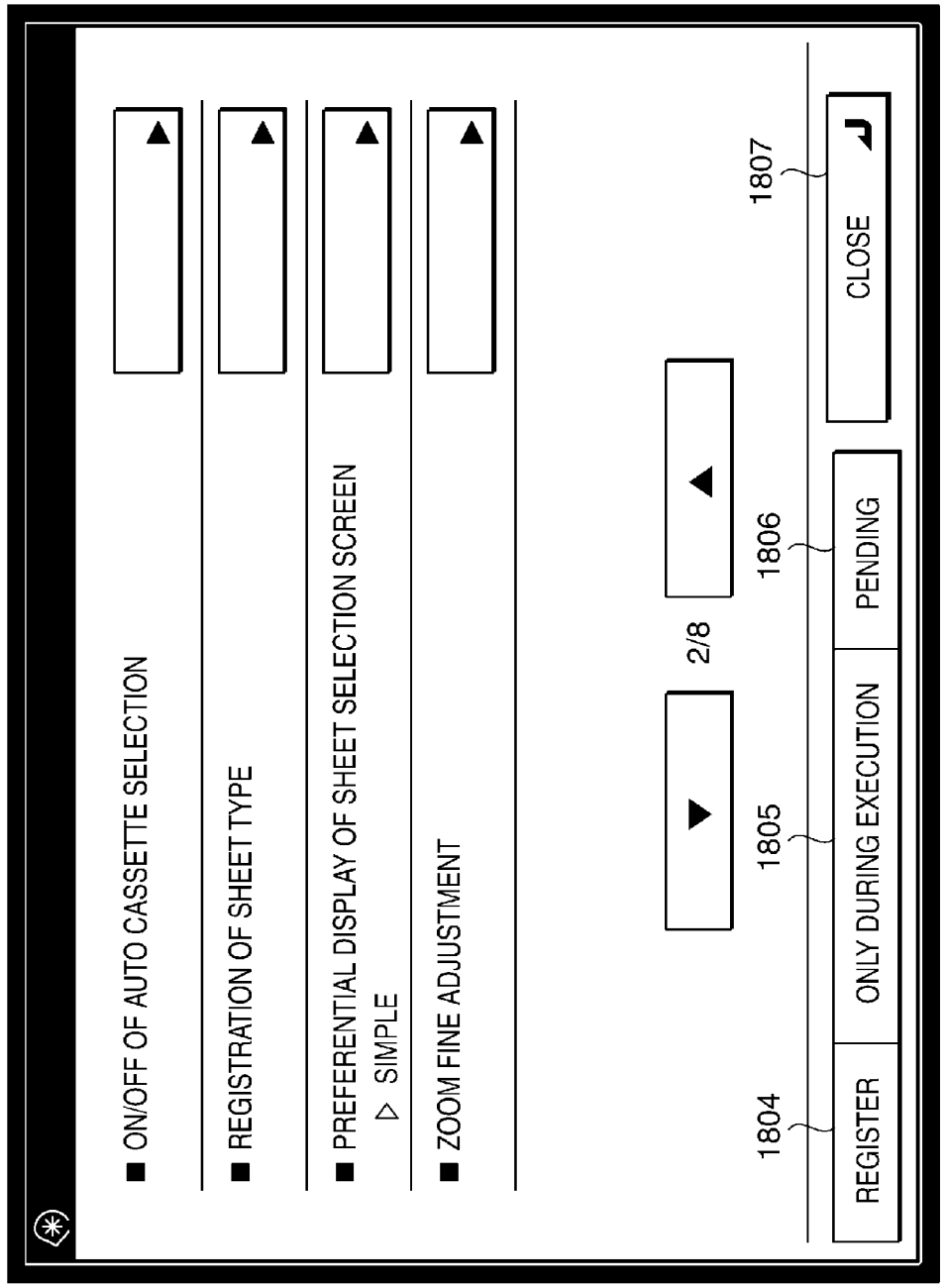
FIG. 8 is a view of an example of a screen displayed on the liquid crystal display when the user mode key appearing in FIG. 4 is pressed in a case where the screen shown in FIG. 5A-3 has been displayed.

When one of the steps S703, S712, and S713 is completed, the process proceeds to a step S714 in FIG. 7B, wherein the CPU 201 detects depression of a "close" button 1807 in FIG. 8 or 9 and switches the currently displayed screen back to the configuration screen having been displayed immediately before depression of the user mode key 406.

In a step S715, the CPU 201 executes a job. The job is executed e.g. by pressing the start key 402.

In a step S716, if the user mode settings are stored in a temporary area of the volatile memory, the CPU 201 executes the job using the settings. If not, the CPU 201 executes the job using information stored in the nonvolatile memory.

In a step S717, the CPU 201 checks whether the pending flag has been set. If the flag has been set, the process proceeds to a step S718, wherein the CPU 201 causes the liquid crystal display 203 to display thereon a "final determination" button and a "cancel" button as appearing in FIG. 10A or 10B.

On a copy screen 1905 shown in FIG. 10A, there are displayed the "final determination" button 1901 and the "abandon" button 1902. On a hold job screen 1906 shown in FIG. 10B, there are displayed the "final determination" button 1903 and the "cancel" button 1904.

In a step S719, the CPU 201 performs determination as to whether or not to finally determine the user mode. If the "final determination" button 1901 is pressed (on the copy screen 1905), the CPU 201 sets the values stored in the temporary area, in the nonvolatile memory in a step S720, followed by terminating the present process. If the "abandon" button 1902 is pressed (on the copy screen 1905), the CPU 201 abandons the values stored in the temporary area in a step S721, followed by terminating the present process.

The user interface of the present invention includes the application mode configuration screen for configuring an application mode when executing a job and the user mode configuration screen for configuring a user mode before executing a job. When the user mode configuration screen is to be displayed, it is determined whether or not the application mode configuration screen is being displayed. Then, if it is determined that the application mode configuration screen is being displayed, user mode items related to application mode configuration are displayed.

Further, the user interface of the present invention includes the first configuration unit for configuring necessary settings when executing a job and the second configuration unit for configuring necessary settings before executing a job. The first configuration unit includes a display unit for displaying a list of configurable attributes, and an input unit for enabling one attribute to be selected from a list of attributes displayed and set an attribute value thereof. The second configuration unit includes a control unit for causing the display unit to display items configurable by the second configuration unit during execution of configuration by the first configuration unit, and controlling the number of items which can be configured, in a manner interlocked with conditions of configuration being executed by the first configuration unit.

Further, the second configuration unit includes a first selection unit for selecting items to be nullified, in a manner interlocked with conditions of configuration being executed by the first configuration unit.

Furthermore, the second configuration unit includes a second selection unit for selecting whether to immediately cause settings configured by itself to be reflected or to make the settings pending so as to cause them to be reflected in desired timing.

As described above, according to the present invention, if the user mode key 406 is pressed when an application mode is being configured, user mode items related to a configuration item being displayed in the application mode are displayed, which enables the intuitive configuration of the user mode items. This also makes it possible to easily grasp items to be nullified by configuration of the application mode.

What is more, it is possible to try once how configured user mode settings work, before registering them in the MFP. This makes it possible to set user mode items the number of which tends to increase, without an error or properly as intended, which improves the convenience of users.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-278446 filed Oct. 29, 2008, which is hereby incorporated by reference herein in its entirety.

What is claimed is:

1. A user interface including (a) an application mode configuration screen for configuring a plurality of configuration items applicable to a particular job when executing the particular job, and (b) a user mode configuration screen for configuring a plurality of configuration items applicable to a plurality of jobs before job execution, the user interface comprising:
a determination unit adapted, when an instruction for displaying the user mode configuration screen is issued, to determine whether or not the application mode configuration screen is being displayed; and
a display unit adapted, when said determination unit determines that the application mode configuration screen is not being displayed, to display all configuration items configurable on the user mode configuration screen, whereas said display unit is adapted, when said determination unit determines that the application mode configuration screen is being displayed, to display among all the configuration items configurable on the user mode configuration screen, configuration items related to the configuration items configurable on the application mode configuration screen being displayed.

2. A method of controlling a user interface that includes (a) an application mode configuration screen for configuring a plurality of configuration items applicable to a particular job when executing the particular job, and (b) a user mode configuration screen for configuring a plurality of configuration items applicable to a plurality of jobs before job execution, the method comprising:
determining, when an instruction for displaying the user mode configuration screen is issued, whether or not the application mode configuration screen is being displayed; and
displaying, when it is determined in said determining that the application mode configuration screen is not being displayed, all configuration items configurable on the user mode configuration screen, and, when it is determined in said determining that the application mode configuration screen is being displayed, displaying, among all the configuration items configurable on the user mode configuration screen, configuration items related to the configuration items configurable on the application mode configuration screen being displayed.

3. A non-transitory computer-readable storage medium storing a program executable at least by a computer to execute a method of controlling a user interface including (a) an application mode configuration screen for configuring a plurality of configuration items applicable to a particular job when executing the particular job, and (b) a user mode configuration screen for configuring a plurality of configuration items applicable to a plurality of jobs before job execution, the program comprising:
a determining module adapted, when an instruction for displaying the user mode configuration screen is issued, to determine whether or not the application mode configuration screen is being displayed; and
a displaying module adapted, when it is determined by said determining module that the application mode configuration screen is not being displayed, to display all configuration items configurable on the user mode configuration screen, whereas said display module is adapted, when said determination module determines that the application mode configuration screen is being displayed, to display among all the configuration items configurable on the user mode configuration screen, configuration items related to the configuration items configurable on the application mode configuration screen being displayed.

4. An image processing apparatus adapted to present at least a user interface including (a) an application mode configuration screen for configuring a plurality of configuration items applicable to a particular job when executing the particular job, and (b) a user mode configuration screen for configuring a plurality of configuration items applicable to a plurality of jobs before job execution, the image processing apparatus comprising:

a determination unit adapted, when an instruction for displaying the user mode configuration screen is issued, to determine whether or not the application mode configuration screen is being displayed; and a display unit adapted, when said determination unit determines that the application mode configuration screen is not being displayed, to display all configuration items configurable on the user mode configuration screen, whereas said display unit is adapted, when said determination unit determines that the application mode configuration screen is being displayed, to display among all the configuration items configurable on the user mode configuration screen, configuration items related to the configuration items configurable on the application mode configuration screen being displayed.

5. A user interface comprising:

a first configuration unit adapted to configure necessary settings when executing a job;

a second configuration unit adapted to configure necessary settings before executing the job; and a display unit adapted to display configurable attributes, wherein said first configuration unit includes an input unit adapted to enable one attribute to be selected from a list of attributes displayed on said display unit, and an attribute value thereof to be set, wherein said second configuration unit includes a control unit adapted to cause said display unit to display items configurable by said second configuration unit during execution of configuration by said first configuration unit, and to control a number of items which can be configured, in a manner interlocked with conditions of configuration being executed by said first configuration unit, and wherein the control unit is adapted to control the number of items which can be configured to be fewer than that which would be displayed by said display unit in a case that said second configuration unit starts executing configuration at a time when the first configuration unit is executing no configuration.

6. The user interface according to claim 5, wherein said second configuration unit includes a first selection unit adapted to select an item to be nullified in a manner interlocked with the conditions of configuration being executed by said first configuration unit.

7. The user interface according to claim 5, wherein said second configuration unit includes a second selection unit adapted to select whether to cause settings configured by said second configuration unit itself to be immediately reflected or to make the settings pending so to cause the settings to be reflected in desired timing.

8. The user interface according to claim 1, wherein said display unit is adapted to display configuration items in a manner distinguishable between configuration items to be nullified by the configuration items which can be set on the application mode configuration screen being displayed and configuration items not to be nullified thereby.

9. The user interface according to claim 1, further comprising another determination unit adapted to determine whether or not to make the configuration items configured on the user mode configuration screen apply to only the particular job to be executed.

* * * * *